United States Patent [19]

Dickson et al.

[11] Patent Number: 5,153,991
[45] Date of Patent: Oct. 13, 1992

[54] BEARINGS

[75] Inventors: Eric W. Dickson, Taunton, England; Ian T. Graham, Ayr, Scotland

[73] Assignee: The Glacier Metal Company Limited, Northwood Hills, England

[21] Appl. No.: 593,877

[22] Filed: Oct. 5, 1990

[30] Foreign Application Priority Data

Oct. 19, 1989 [GB] United Kingdom ............... 8923552

[51] Int. Cl.⁵ .............................................. B21D 53/10
[52] U.S. Cl. ................... 29/898.058; 29/898.059; 29/412; 29/898.056
[58] Field of Search ........... 29/898.56, 898.57, 898.58, 29/898.59, 412

[56] References Cited

U.S. PATENT DOCUMENTS

| 1,906,273 | 5/1933 | Klocke | 29/898.058 |
| 2,338,858 | 1/1944 | Lignian | 29/898.058 |
| 2,555,497 | 2/1945 | McCullough et al. | 29/898.058 |
| 3,455,004 | 7/1969 | Tethal | 29/898.057 |
| 3,521,343 | 7/1970 | Green et al. | 29/898.057 |
| 4,658,500 | 4/1987 | Engel et al. | 29/898.059 X |

Primary Examiner—Timothy V. Eley
Assistant Examiner—C. Richard Martin
Attorney, Agent, or Firm—William R. Hinds

[57] ABSTRACT

A method of manufacturing a bearing is described, the method comprising the steps of preparing a flat blank having a steel backing layer and a bearing alloy lining, the blank having an area corresponding to the projected surface area of the bearing, the flat blank also having required bearing features such as oil holes, grooves, and end-face chamfers and forming the flat blank directly into an associated bearing housing. The thickness of the flat blank should lie in the range from 0.25 to 0.75 mm. The blank may correspond in major dimension to a half bearing or to a full cylindrical bush.

17 Claims, 5 Drawing Sheets

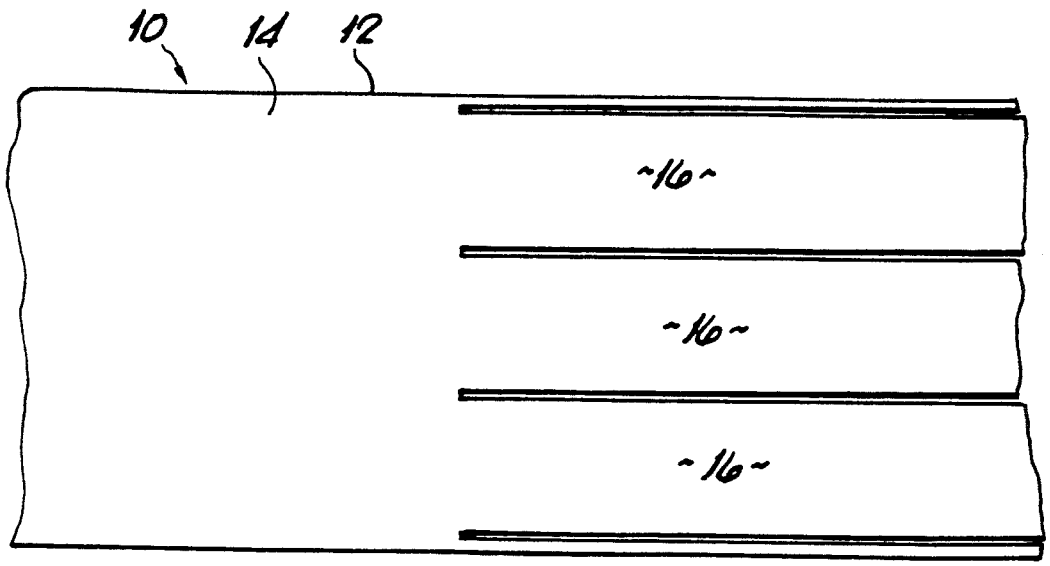
FIG. 1
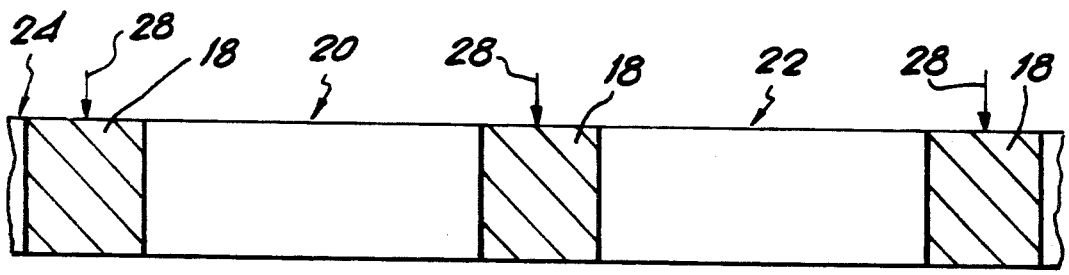
FIG. 2
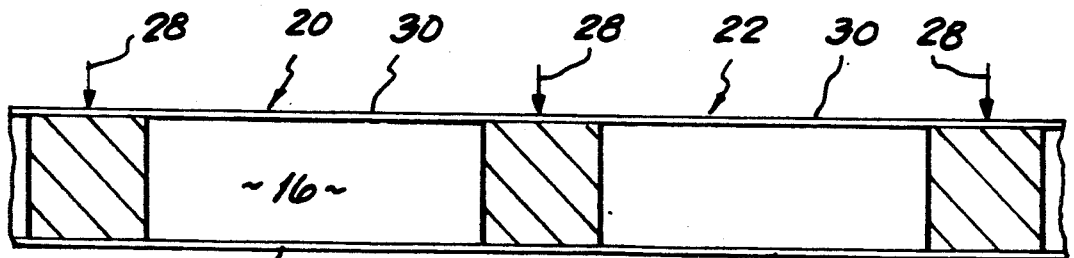
FIG. 3
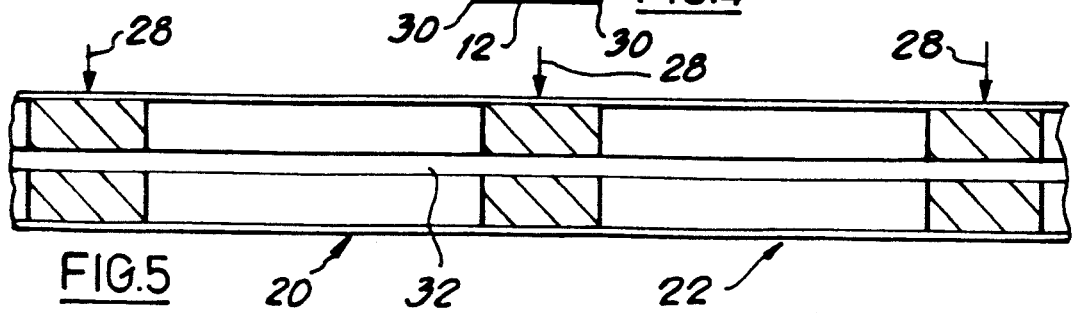
FIG. 4
FIG. 5

BEARINGS

The present invention relates to bearings and particularly to a method of making bearings known as thin-wall bearings.

Thin-wall half bearings are currently made by a long, complex and expensive series of mechanical forming and machining steps. The present method begins with a strip or coil of material which generally comprises a steel backing layer having thereon a bearing material lining. The lining usually comprises a copper-based or aluminium-based alloy and has been bonded to the steel by casting or sintering in the case of copper-based alloys or usually, by roll-pressure bonding in the case of aluminium-based alloys. Depending upon the diameter of the bearing to be made the strip material usually lies in thickness range from 1.5 mm to 5.0 mm. Blanks slightly larger than the projected surface area of the desired bearing are cut from strip and formed during several bending operations into a semi-cylinder after which the axial location nick is formed, the bearing end face chamfers are machined, the joint faces are broached and final bore size is provided either by broaching or boring. Other operations such as the provision of oil holes, grooves etc. are usually also carried out on the part finished bearing when in a semi-cylindrical condition. The resulting finished half bearing may then be assembled directly into the main or big-end bearing housing in the engine.

It is generally acknowledged in the bearing art that, for a given bearing lining material, the fatigue resistance of the lining increases with decreasing lining thickness. The final forming operation to produce a semi-cylindrical part is known as coining, where the strip ends are struck by a press punch to force the bent blank to conform to semi-cylindrical die cup. Due to the coining operation, the material at the joint face region undergoes a relatively considerable swelling due to plastic compressive deformation. The swelling causes the residual lining thickness of the joint face region to be reduced after boring compared to the lining thickness at the crown region of the bearing. The effect of such joint face swelling is to necessitate a thicker lining than may be desirable.

Apart from the complexity and cost of the above production procedure, handling of the half bearings by machinery, such as robots, in automated engine assembly lines is difficult. Automated assembly apparatus is better able to handle flat, rectangular pieces than semi-cylindrical pieces.

It is an object of the present invention to reduce the cost of manufacture of half bearings. It is a further objective to produce pieces which are more easily handled by automated assembly apparatus. It is a yet further objective to provide a method where joint face swelling is reduced.

According to the present invention there is provided a method of manufacturing a bearing, the method comprising the steps of preparing a flat blank having a steel backing layer and a bearing alloy lining, the blank having an area corresponding to the projected surface area of the bearing, the flat blank also having required bearing features such as oil holes and end-face chamfers and forming the flat blank directly into an associated bearing housing.

It is desirable that the strip from which the flat blank is made is considerably thinner than has heretofore been customary. The blank thickness may lie in the range from 0.25 mm to 0.75 mm. The lining thickness may lie in the range from 0.1 mm to 0.25 mm and the steel backing in the range from 0.15 mm to 0.525 mm.

The bearing blanks may be of a size such as to form a half bearing or may be such as to constitute a full cylindrical bearing bush when formed into the bearing housing.

An advantage of using a single blank to form a full cylindrical bush is that it is easily handled and there is no danger of the free ends becoming overlapped.

Advantageously the blanks are produced from a continuous strip of material comprising the steel and bearing alloy layers.

Preferably bearing blanks may be produced having their major dimension parallel to the strip axis; this is commonly known as the down-strip direction. By producing the blanks in this direction a wide strip may be slit accurately into strips having a width which corresponds to the final bearing axial length and may have any bearing end-face chamfers formed on the slit strip. Each blank may then be produced merely by blanking to an accurate length, perhaps with an intervening waste portion and, after the other necessary features have been applied.

It is desirable to form all the bearing features on the blank when in the flat condition since it is envisaged that after initial fitting of the blank to the bearing housing, the shaft will be installed and the housing and it's associated cap secured together as a final operation. This, of course, does not necessarily preclude the present method being used in place of the existing method of bearing production and removing the formed bearing from its housing, or from a forming cup being used in place of the housing, and providing formed half bearings to be used, for example, in a bearing spares operation. Thus, any reference to housing in this specification also includes a forming cup or die. It should be remembered, however, that owing to the thinner material used in bearings of the present invention, the degree of "freespread" on removing the bearing from its housing or forming cup will be much greater than for a conventional bearing. The "freespread" is the elastic spring back which occurs when a bearing is removed from its housing and adopts a dimension across the ends which is greater than the nominal diameter.

It is necessary to form the flat blank into its housing without the formation of any kinks or discontinuities which may affect the bearing surface in relation to its hydrodynamic operation in, for example, a reciprocating internal combustion engine or a piece of rotating machinery.

The total final wall thickness of the finished bearing may be produced either by a deformation process such as rolling of the strip material or by machining of the lining or backing by milling, for example. Such shaping may also include some compensation for anticlastic deformation which occurs during forming of the half bearing. The degree of anticlastic deformation, however, is much less with the thinner material of the present invention than in conventional bearings and as such, this is an advantage.

In order that the present invention may be more fully understood an example will now be described by way of illustration only with reference to the accompanying drawings, showing a series of manufacturing stages schematically depicted, of which:

FIG. 1 shows a strip being slit into bearing widths;

FIG. 2 shows a slit strip having joint face relief applied;

FIG. 3 shows the strip of FIG. 2 being chamfered;

FIG. 4 shows the strip of FIG. 3 in cross-section;

FIG. 5 shows the strip of FIG. 3 having an oil groove machined;

Figure 6:
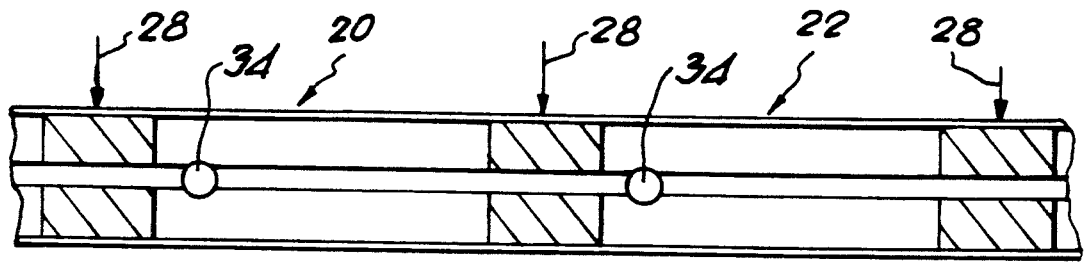
FIG. 6 shows the strip of FIG. 5 having an oil hole formed.

Referring now to the drawings and where the same features are denoted by common reference numerals.

Figure 7:
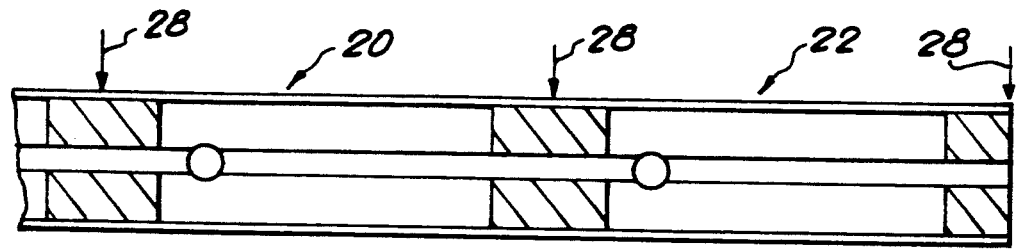
FIG. 7 shows the strip of FIG. 6 being machined to a desired wall thickness.
Figure 8:
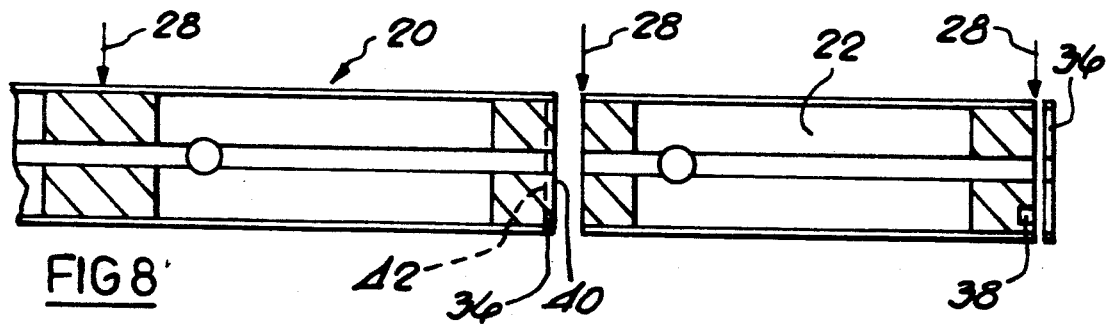
FIG. 8 shows the strip of FIG. 7 having a bearing blank separated and the nick applied.
Figure 9:
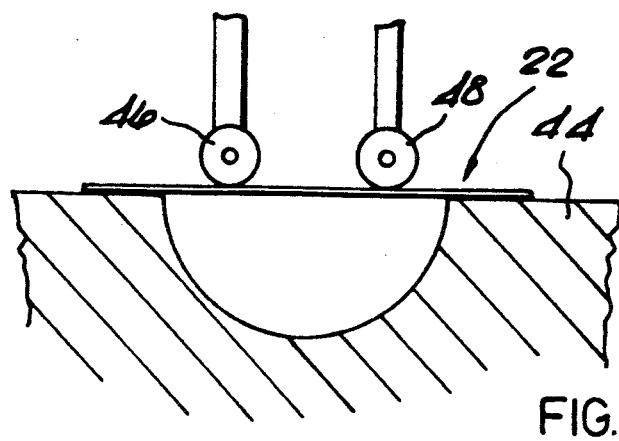
FIG. 9 shows the blank of FIG. 8 about to be formed into a bearing housing.
Figure 10:
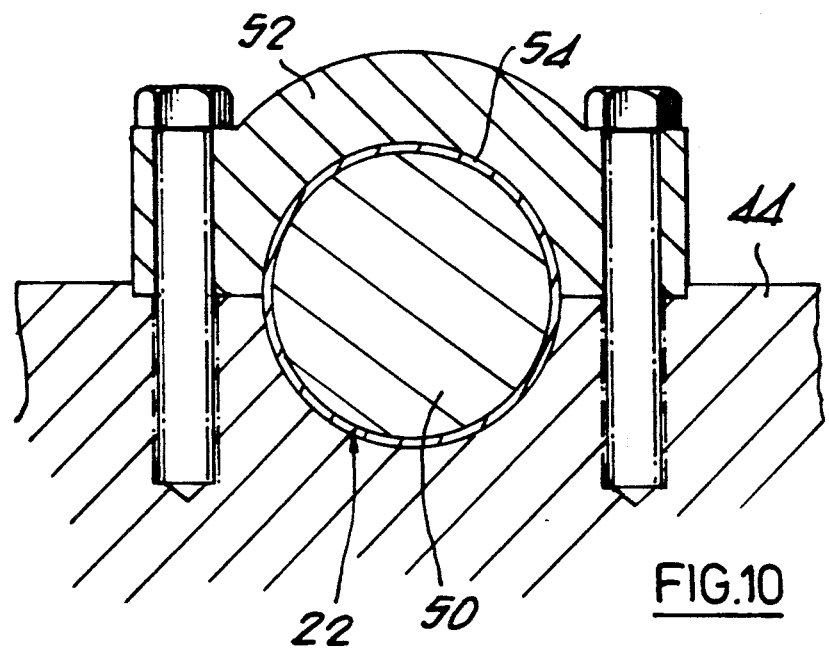
FIG. 10 shows the co-operating cap half to the housing of FIG. 9 in place.

A coil of material 10 comprising a steel backing 12 of thickness 0.4 mm and having a lining 14 of Al - Sn 20 - Cu 1 0.2 mm thick produced by a cold, roll pressure bonding operation is slit into bearing widths 16 by sawing or shearing (FIG. 1). The width of the strips 16 corresponds to the axial length of the final half bearing. FIG. 2 shows one of the strips 16 having the lining 14 machined away in the regions 18 and which will correspond to the areas of joint face relief in the final bearing. The areas 18 are shown spanning the adjacent areas of two complete blanks 20, 22 and two part blanks 24, 26. The arrows 28 denote the approximate position where the strip 16 will be cut into individual blanks. After the joint face relief is machined the strip 16 is then chamfered 30 (FIGS. 3 and 4) to remove any burrs which may have been produced in earlier stages. The cross section at FIG. 4 shows the strip thickness and chamfers greatly exaggerated. An oil groove 32 (FIG. 5) is then machined along the strip length followed by piercing of oil holes 34 which are also deburred and chamferred. (FIG. 6). The lining 14 is next machined to produce the final bearing wall thickness and any allowance in cross sectional shape to cater for anticlastic deformation. (FIG. 7). The full blank 22 is removed in a single blanking operation by means of a fixed length die (not shown) which leaves a small piece of scrap 36 and also produces the location and anti-rotation nick 38 (FIG. 8). The following blank 20 has, at its leading edge 40 provision for the scrap piece 36 indicated by the dashed line 42. The finished, flat blank 22 may then be formed into its housing 44 by means of the punches 46, 48 which exert a constant bending moment on the blank 22 during forming into the housing (FIG. 9). After the blank has been inserted into the housing 44 the shaft 50 may be inserted and the co-operating cap-half 52 togther with its associated bearing half 54 may be bolted to the housing 44 (FIG. 10) to form the finished assembly; tightening of the cap half 52 causing the two halves 22 and 54 to become fully seated.

Only very shallow oil grooves are possible when formed in the bearing. If greater oil flow is desired the groove may be formed in the housing with additional oil access holes or a slot in the bearing.

Desirably the machining step to produce the finished lining thickness should be left as near as possible to the end of the production sequence to minimise the risk of damage to the lining surface.

The blanks 22, 20 etc may alternatively be separated from the strip 16 by sawing, the nick 38 being formed by pressing immediately before removal of the scrap piece 36 and the blank 22 from the strip 16.

Figure 11:
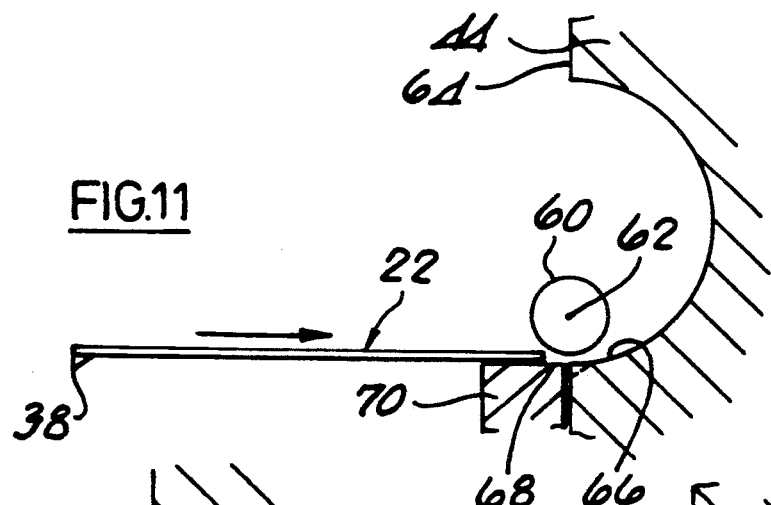
FIGS. 11 to 13 show an alternative method to that illustrated in FIG. 9 for forming the flat blank into its housing.
Figure 12:
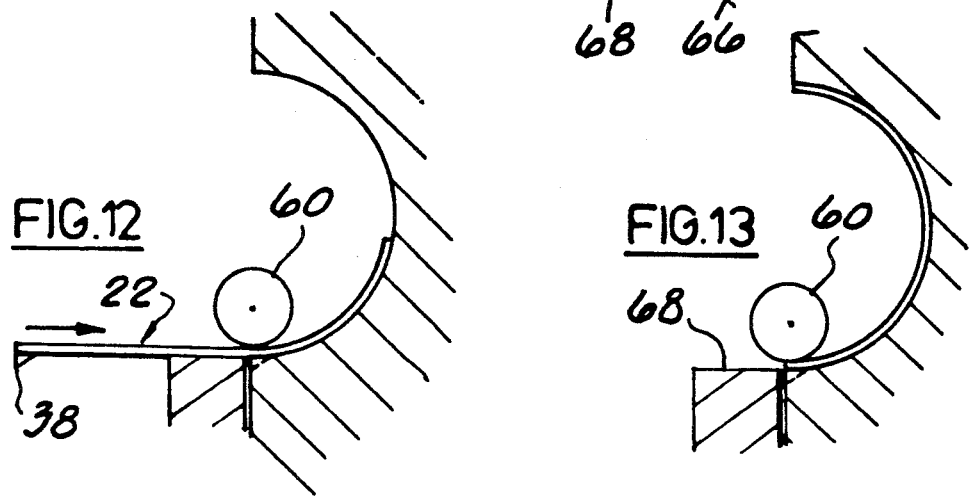
Figure 13:
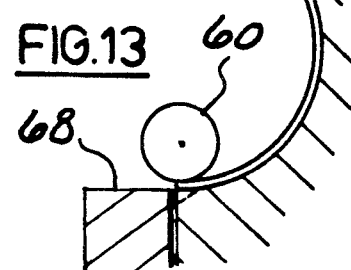
Figure 14:
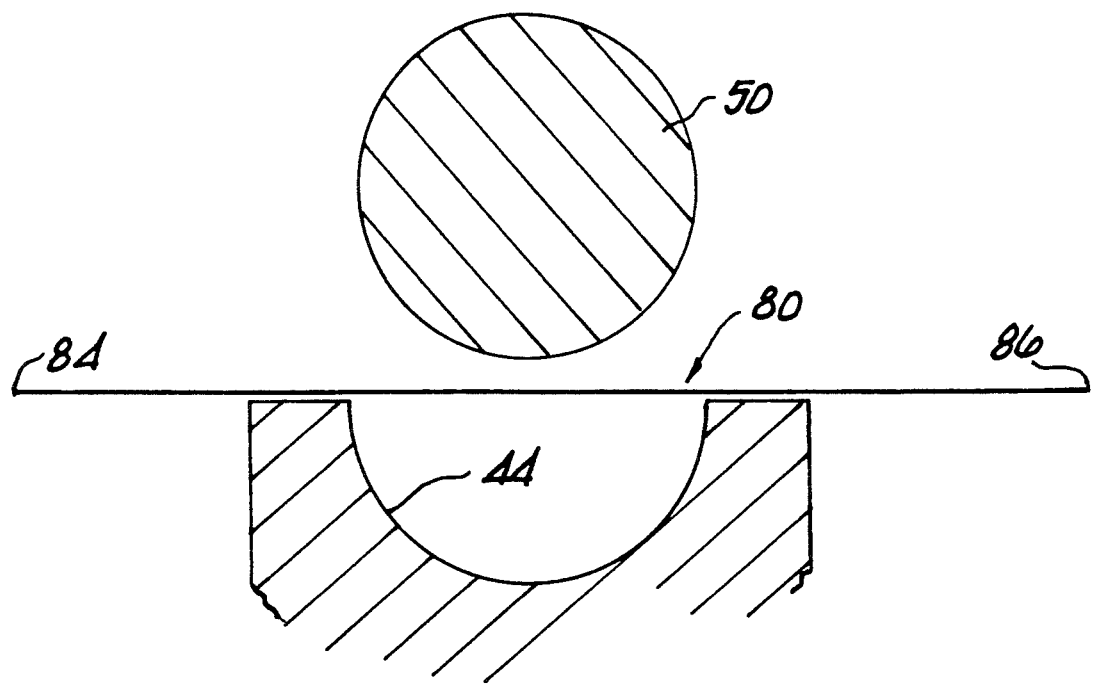
FIGS. 14 to 17 which show schematic representations of a blank being formed into a bearing housing to produce a full cylindrical bush.

FIGS. 11 to 13 show an alternative sequence where the flat blank 22 is pushed into the housing 44 between a guide wheel 60, having an axis 62 in the same plane as the joint faces 64, the periphery 66 of the housing bore and the top surface 68 of guide plate 70. The end having the nick 38 is the last to enter the housing.

Figure 15:
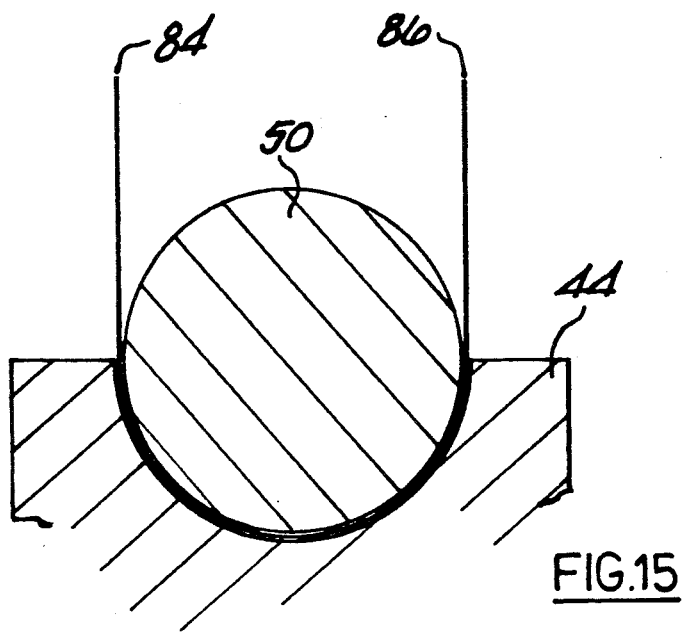
Figure 16:
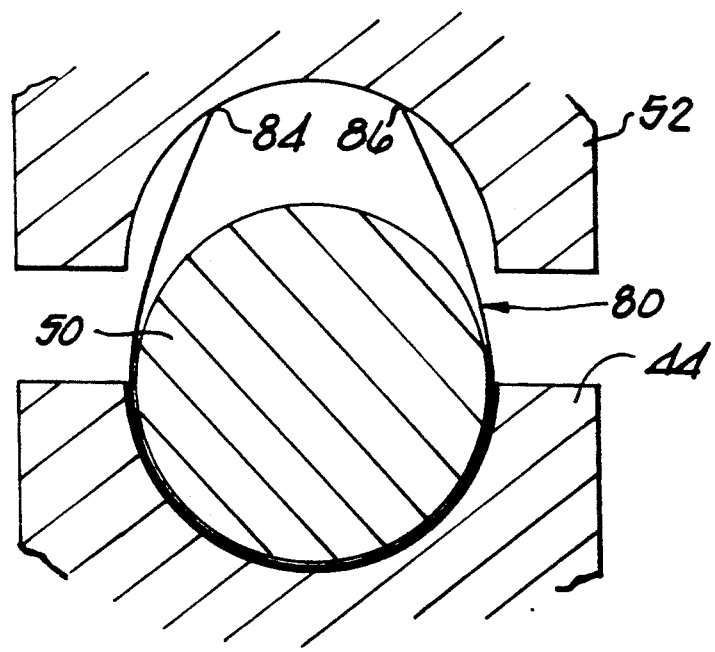
Figure 17:
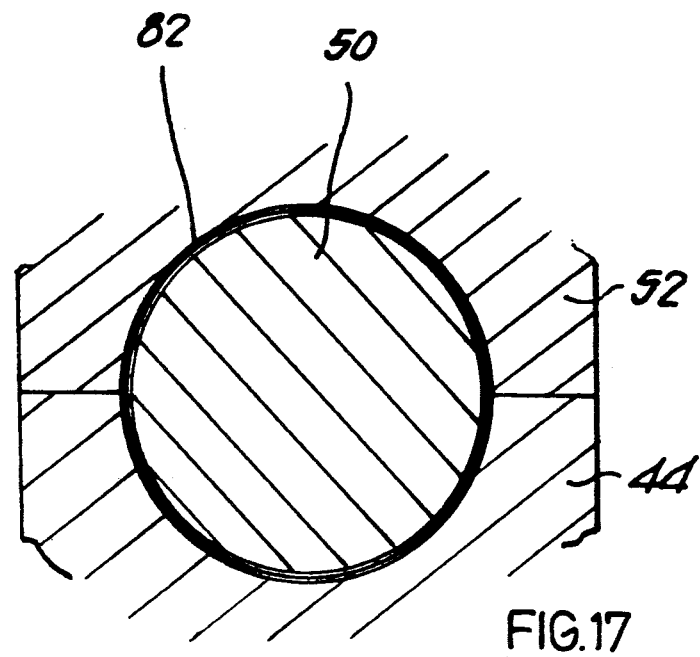

FIGS. 14 to 17 show schematically a sequence of steps to install a blank 80 into a bearing housing 44 and cap 52 to form a full cylindrical bush 82. The blank 90 is first laid across the housing 44 in a manner such that the butt ends 84, 86 lie in the position remote from the highly loaded region of the bearing in operation. The shaft (shown as journal 50) is then installed causing the ends 84,86 to become upstanding (FIGS. 15). The ends 84, 86 are then squeezed in an inwardly direction to allow the cap half 52 to be put in place. The act of tightening down the cap half causes the bearing bush 82 to be formed.

We claim:

1. A method of manufacturing a bearing, the method comprising the steps of preparing a flat blank having a steel backing layer and a bearing alloy lining, the blank having an area corresponding to the projected surface area of the bearing, forming in the flat blank any required bearing features of the finished bearing, and forming the flat blank directly into an associated bearing housing.

2. A method according to claim 1 wherein the thickness of said flat blank lies in the range from 0.25 to 0.75 mm.

3. A method according to claim 2 wherein the thickness of said bearing alloy lining lies in the range from 0.1 to 0.25 mm.

4. A method according to claim 2 wherein said steel backing layer thickness lies in the range from 0.15 to 0.525 mm.

5. A method according to claim 1 wherein the thickness of said bearing alloy lining lies in the range from 0.1 to 0.25 mm.

6. A method according to claim 1 wherein said steel backing layer thickness lies in the range from 0.15 to 0.525 mm.

7. A method according to claim 1 wherein said blanks are produced from a continuous strip of material.

8. A method according to claim 7 wherein said blanks are produced having their major dimension parallel to the axis of the strip from which they are produced.

9. A method according to claim 8 wherein a wide strip is slit into two or more narrower strips having a width corresponding to the final bearing axial length.

10. A method according to claim 7 wherein a wide strip is slit into two or more narrower strips having a width corresponding to the final bearing axial length.

11. A method according to claim 9 wherein chamfers are applied to the edges of the narrower strips.

12. A method according to claim 10 wherein all of the featuring and sizing operations are carried out on the strip prior to severing the blank therefrom.

13. A method according to claim 7 wherein all of the featuring and sizing operations are carried out on the strip prior to severing the blank therefrom.

14. A method according to claim 1 wherein the blank major dimension corresponds to a half bearing.

15. A method according to claim 1 wherein the blank major dimension corresponds to a full cylindrical bush.

16. A bearing blank when made by the method of claim 1 prior to fitting into a bearing housing.

17. A bearing when formed by the method of claim 1.

* * * * *